US012609500B2

(12) United States Patent
Tsai

(10) Patent No.: US 12,609,500 B2
(45) Date of Patent: Apr. 21, 2026

(54) POWER SUPPLY WITH INTERCHANGEABLE PLUGS

(71) Applicant: PHIHONG TECHNOLOGY CO., LTD., Taoyuan City (TW)

(72) Inventor: Ming-Ching Tsai, Taoyuan City (TW)

(73) Assignee: PHIHONG TECHNOLOGY CO., LTD., Taoyuan City (TW)

(*) Notice: Subject to any disclaimer, the term of this patent is extended or adjusted under 35 U.S.C. 154(b) by 300 days.

(21) Appl. No.: 18/360,569

(22) Filed: Jul. 27, 2023

(65) Prior Publication Data

US 2025/0038463 A1 Jan. 30, 2025

(51) Int. Cl.
*H01R 27/00* (2006.01)
*H01R 13/629* (2006.01)
*H01R 13/639* (2006.01)

(52) U.S. Cl.
CPC ........... *H01R 27/00* (2013.01); *H01R 13/629* (2013.01); *H01R 13/639* (2013.01)

(58) Field of Classification Search
CPC ........................................................ H01R 27/00
See application file for complete search history.

(56) References Cited

U.S. PATENT DOCUMENTS 1,486,790 A * 3/1924 Nutt ....................... H01R 33/94 439/646
2,499,296 A * 2/1950 Buchanan ............. H01R 13/111 D13/133
4,973,827 A * 11/1990 Nozaki ................ H05B 1/0225 219/521
5,613,863 A * 3/1997 Klaus ..................... H01R 31/06 D13/110
5,634,806 A * 6/1997 Hahn ...................... H01R 27/00 439/172
5,684,689 A * 11/1997 Hahn ................. H01R 13/6675 363/146
7,008,246 B2 * 3/2006 Zhuge .................... H01R 31/06 439/131
7,264,492 B2 * 9/2007 Liang ..................... H01R 24/28 439/151
7,489,952 B2 * 2/2009 Simoes ................. H02J 7/0044 320/112
7,654,838 B1 * 2/2010 Zhuge .................... H01R 27/00 439/173

(Continued)

*Primary Examiner* — Neil Abrams
(74) *Attorney, Agent, or Firm* — MUNCY, GEISSLER, OLDS & LOWE, P.C.

(57) ABSTRACT

A power supply includes a power adapter unit and a plug unit. The power adapter unit includes a housing with an engaging base formed over bottom surface of the housing, a power conversion module installed in the housing, two electric contact pins in the engaging base electric connecting with the power conversion module, a locking member adjacent to the engaging base. The plug unit is slidably engaged with the engaging base including two plug pins and each of the plug pins electrically connected to a metal contact located at inner side of the plug unit, a locking matching member to interact with the locking member for allowing the plug unit lock or unlock from the engaging base. The plug unit is interchangeable with the power adapter unit. The metal contacts and the plug pins provide additional interlock interaction when the plug unit is slidably engaged with the power adapter unit.

14 Claims, 8 Drawing Sheets

(56) References Cited

U.S. PATENT DOCUMENTS

| | | | | |
|---|---|---|---|---|
| 9,166,351 | B1 * | 10/2015 | Wang | H01R 24/66 |
| 9,537,248 | B2 * | 1/2017 | Hung | H01R 31/06 |
| 9,722,377 | B1 * | 8/2017 | Cheng | H01R 13/631 |
| 2011/0171842 | A1 * | 7/2011 | Senatori | H01R 13/6675<br>439/171 |
| 2015/0188270 | A1 * | 7/2015 | Knight | H02K 7/145<br>439/627 |
| 2025/0038463 | A1 * | 1/2025 | Tsai | H01R 31/06 |

* cited by examiner

POWER SUPPLY WITH INTERCHANGEABLE PLUGS

TECHNICAL FIELD

The present invention relates to technology field of plug-in power supply, and more particularly, a power supply with interchangeable plugs.

BACKGROUND

Various consumer electronic products, such as laptops, tablet, smart phones and MP3 players, for example, utilize a power supply plugged into an electrical power outlet to power these devices and/or charge the internal batteries thereof. Nowadays, plug-in power supply units are increasing built as switching mode power supply units. Power supply units can provide electrical power to an electric appliance through a so-called universal input voltage input. However, there exists great differences worldwide between the plug systems and plug shapes, which has the consequence that plug adapters have to be additionally used in most cases; due to the enlarged distance between the plug-in power supply and the power socket, these plug adapters may increase the torque, which acts on the power socket, in an inadmissible manner.

Moreover, in many cases, the plug adapter has only one socket, shaped for use with the power plugs of several types, i.e. the plug adapter socket has some features of different power sockets. This also reduces the safety of the plug adapters, since an accidental contact with the powered pins becomes more probable when pins of a plug are inserted into the plug adapter socket and gaps are left.

Hence, in some cases plug-in power supply is designed to be provided with interchangeable plug units. However, these designs do not have a waterproof function. In addition, security electrical contact design for the interchangeable plug unit engaged with the main portion of the power supply also inadequate, which might cause loose contact duo to external impact. The invention provides a novel design that strengthen contact between the contact shrapnel of the interchangeable head and corresponding pins located at engaging portion of the power supply to reduce the risk of power failure during normal use.

SUMMARY OF THE INVENTION

According one aspect of the present invention, a power supply with interchangeable plug units is provided, which includes a power adapter unit and a plug unit. The power adapter unit includes a housing with an engaging base formed over a bottom surface of the housing, a power conversion module installed in the housing, at least two electric contact pins in the engaging base electric connecting with the power conversion module, a locking member arranged adjacent to the engaging base. The plug unit is slidably engaged with the engaging base, which includes at least two plug pins extending from outer side of the plug unit and each of the plug pins electrically connected to a metal contact located at inner side of the plug unit, a locking matching member to interact with the locking member for allowing the plug unit lock or unlock from the engaging base. The plug unit is interchangeable with the power adapter unit. The metal contacts and the plug pins provide an additional interlock interaction when the plug unit is slidably engaged with the engaging base of the power adapter unit.

In one preferred embodiment, the bottom surface of the housing is an inner side of the power supply facing toward to a power socket inlet while the power supply is plug into the power socket inlet.

In one preferred embodiment, the engaging base is enclosed by a pair of side walls protruding from the bottom case surface, each side wall has front stop, a gap is formed between the front stop of the pair of side walls.

In one preferred embodiment, the plug unit is slidably engaged with the engaging base at the walls.

In one preferred embodiment, the locking member includes a spring and a button with extended tail hook installed in a button recess formed over the bottom surface of the housing, the spring being disposed beneath the button, the tail hook being extended over the gap to the engaging base.

In one preferred embodiment, the button recess is formed along matching direction adjacent to the front stop of the engaging base.

In one preferred embodiment, the locking matching member is a portion of front flange of the plug unit used to establish locking interaction with the tail hook of the button, when the button is pressed down, the locking interaction is released.

In one preferred embodiment, each of the metal contacts of the plug unit includes a metal reed to form a clamp clip with two arms, a small bump formed on inner surface of each arm near tip; each electric contact pin of the power adapter unit has a through hole.

In one preferred embodiment, the additional interlock interaction between the metal contacts and the electric contact pins is established by interlocking between the small bump of the metal contacts and the through hole of the electric contact pin while the plug unit is engaged with the power adapter unit.

In one preferred embodiment, the additional interlock interaction offers additional security in keeping electric contact in plug and unplug directions of the power supply.

In another aspect of the present invention, a power supply with interchangeable plugs is provided, which includes a power adapter unit and a plug unit. The power adapter unit includes a housing with an engaging base formed over a bottom surface of the housing, the bottom surface of the housing is an inner side of the power supply facing toward to a power socket inlet while the power supply is plug into the power socket inlet, at least two electric contact pins in the engaging base, and a locking member arranged adjacent to the engaging base along matching direction of the plug unit. The plug unit is slidably engaged with the engaging base, which includes at least two plug pins extending from outer side of the plug unit and each of the plug pins electrically connected to a metal contact located at inner side of the plug unit, a locking matching member to interact with the locking member for allowing the plug unit lock or unlock from the engaging base. The plug unit is interchangeable with the power adapter unit. The metal contacts and the plug pins provide an additional interlock interaction when the plug unit is slidably engaged with the engaging base of the power adapter unit.

In one preferred embodiment, the power supply further includes a power conversion module installed in the housing electrically connected to the at least two electric contact pins.

In one preferred embodiment, the engaging base is enclosed by a pair of side walls protruding from the bottom case surface, each side wall has front stop, a gap is formed between the front stop of the pair of side walls.

In one preferred embodiment, the plug unit is slidably engaged with the engaging base at the walls.

In one preferred embodiment, the locking member includes a spring and a button with extended tail hook installed in a button recess formed over the bottom surface of the housing, the spring being disposed beneath the button, the tail hook being extended over the gap to the engaging base.

In one preferred embodiment, the button recess is formed along the matching direction adjacent to the front stop of the engaging base.

In one preferred embodiment, the locking matching member is a portion of front flange of the plug unit used to establish locking interaction with the tail hook of the button, when the button is pressed down, the locking interaction is released.

In one preferred embodiment, each of the metal contacts of the plug unit includes a metal reed to form a clamp clip with two arms, a small bump formed on inner surface of each arm near tip; each electric contact pin of the power adapter unit has a through hole.

In one preferred embodiment, the additional interlock interaction between the metal contacts and the electric contact pins is established by interlocking between the small bump of the metal contacts and the through hole of the electric contact pin while the plug unit is engaged with the power adapter unit.

In one preferred embodiment, the additional interlock interaction offers additional security in keeping electric contact in plug and unplug directions of the power supply.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1A:
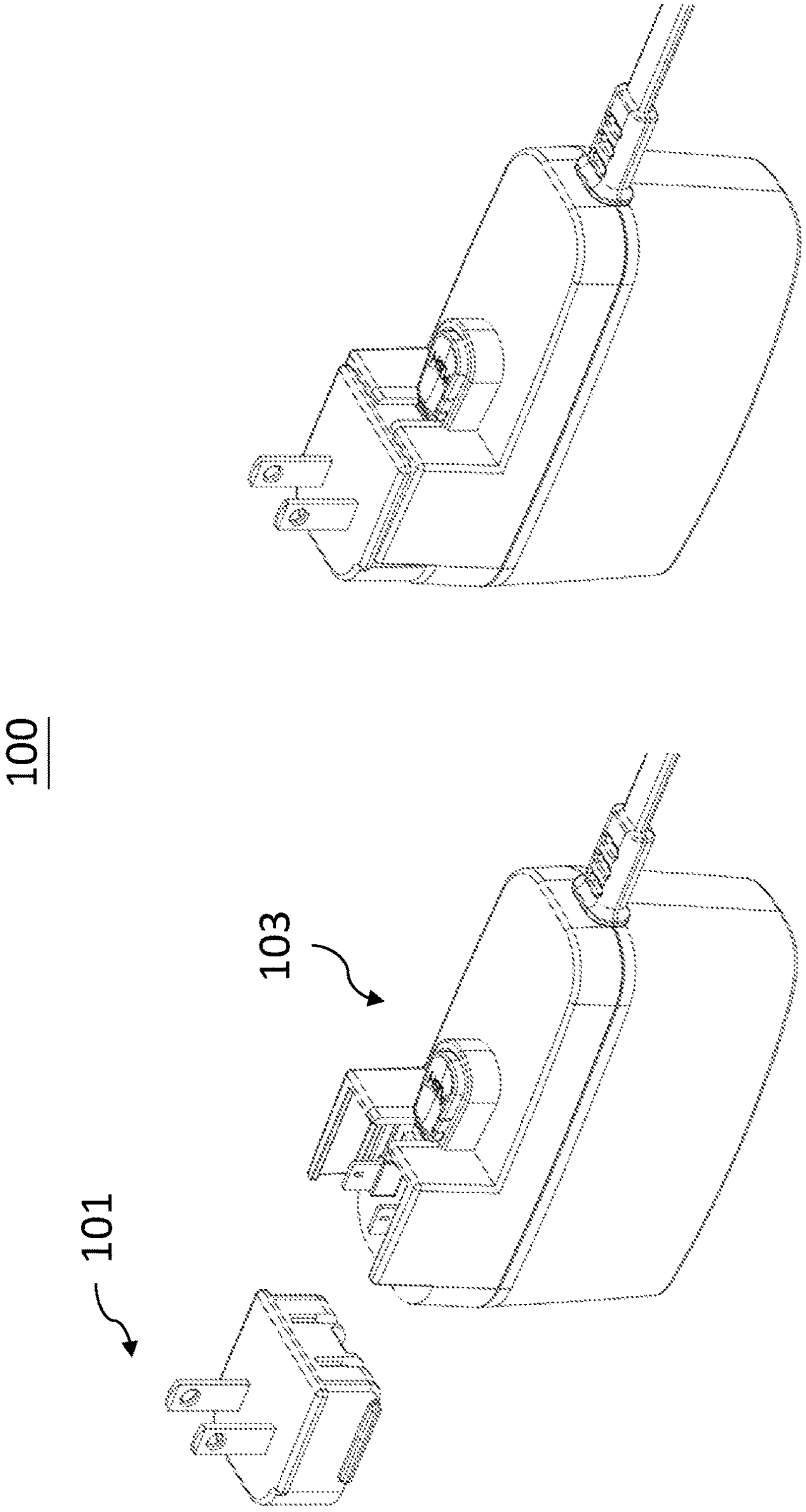
FIG. 1A shows a perspective view of a power supply, ready to be assembled with a plug unit before and after engaging with a power adapter unit according to one preferred embodiment of the present invention.
Figure 1B:
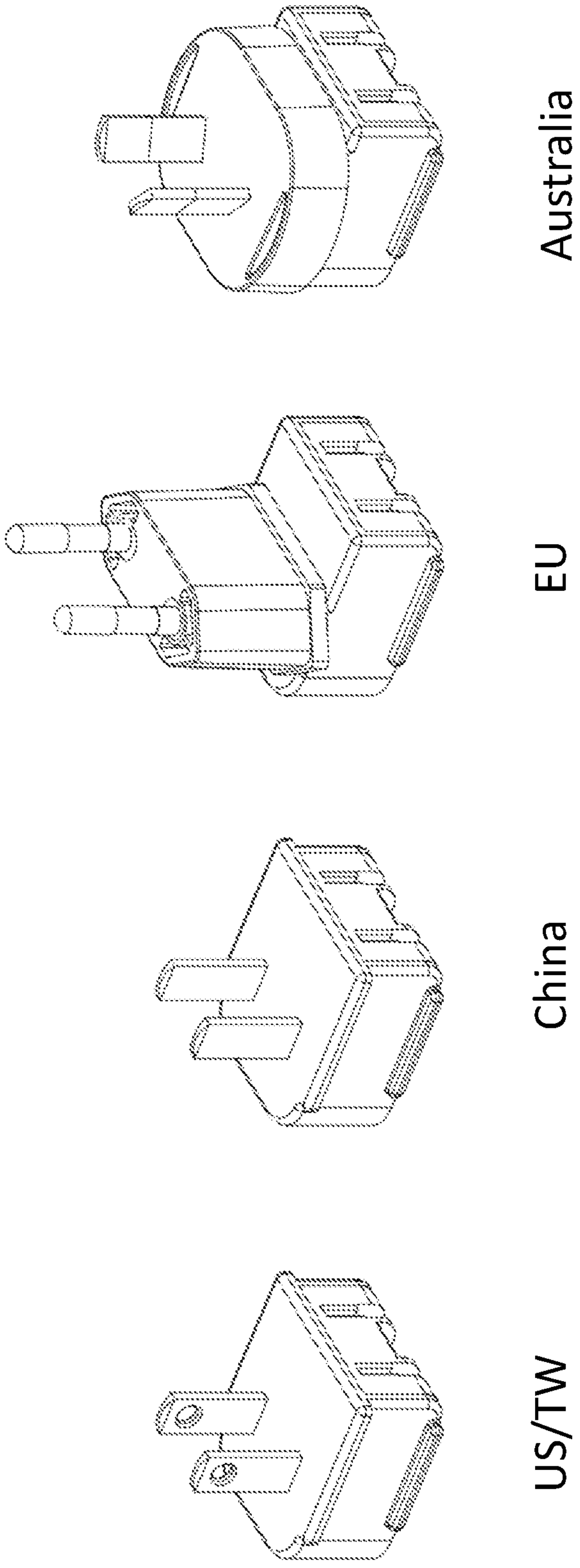
FIG. 1B shows perspective view of various plug units, for example US, China, EU, Australia plugs according to embodiments of the present invention.

Please refer to FIG. 1A, it illustrates a perspective view of a power supply 100, ready to be assembled with a plug unit 101 before and after engaging with a power adapter unit 103. FIG. 1B shows perspective view of various plug units 101, for example US/TW, China, EU and Australia plugs, which are interchangeable and used to be inserted to the power adapter unit 103.

Figure 2:
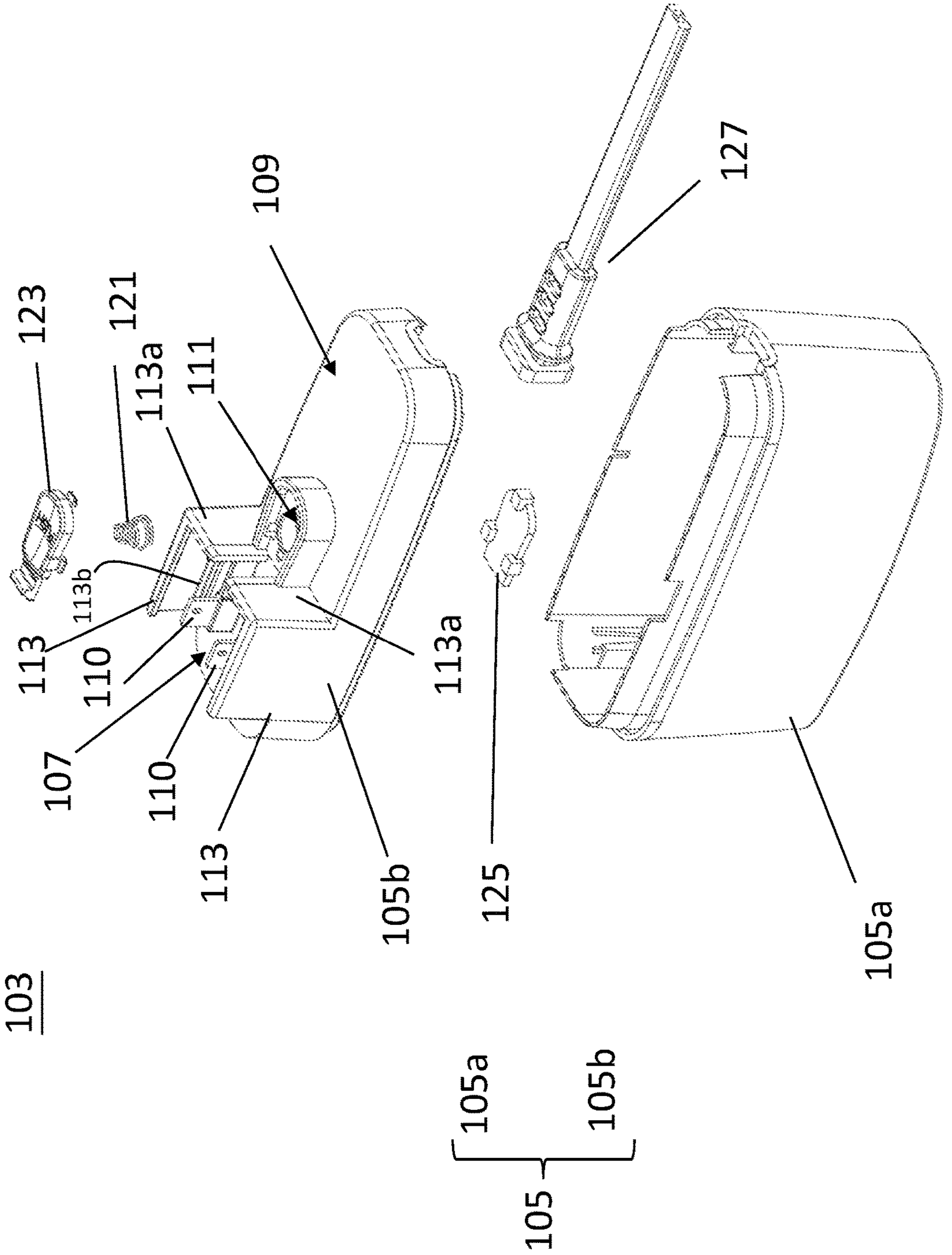
FIG. 2 shows explosion diagram of a power adapter unit according to one preferred embodiment of the present invention.

FIG. 2 illustrates explosion diagram of the power adapter unit 103, which includes a housing 105 composed of top case 105*a* and bottom case 105*b*, an engaging base 107 formed over the bottom case surface 109, two electric contact pins 110 in the engaging base 107, a button recess 111 formed over the bottom case surface 109, a spring 121, a button 123, a button cover 125 and a DC cable 127. The bottom case surface 109 is an inner side of the power supply 100 facing to the power socket inlet while it is plugged into the power socket inlet. The accommodation space enclosed by the top and bottom cases (105*a*, 105*b*) is used to place AC to DC conversion components (transformer) and circuit board (such as PCB), which are not shown here, and a portion of the DC cable 127.

In some embodiments, the engaging base 107 enclosed by a pair of side walls 113 with front stop 113*a* protruding from the bottom case surface 109 for slidably engaging a plug unit 101; the button recess 111 is formed over the bottom case surface 109 and adjacent to the front stop 113*a* of the side walls 113 along the matching direction to receive the spring 121 and the button 123 for locking and unlocking the plug unit 101; the button cover 125 is used to interlock the spring 121 and the button 123 on the button recess 111.

In some embodiments, the AC to DC conversion components (transformer) and circuit board (such as PCB) together can be acted as a power conversion module of the power supply.

Figure 3A:
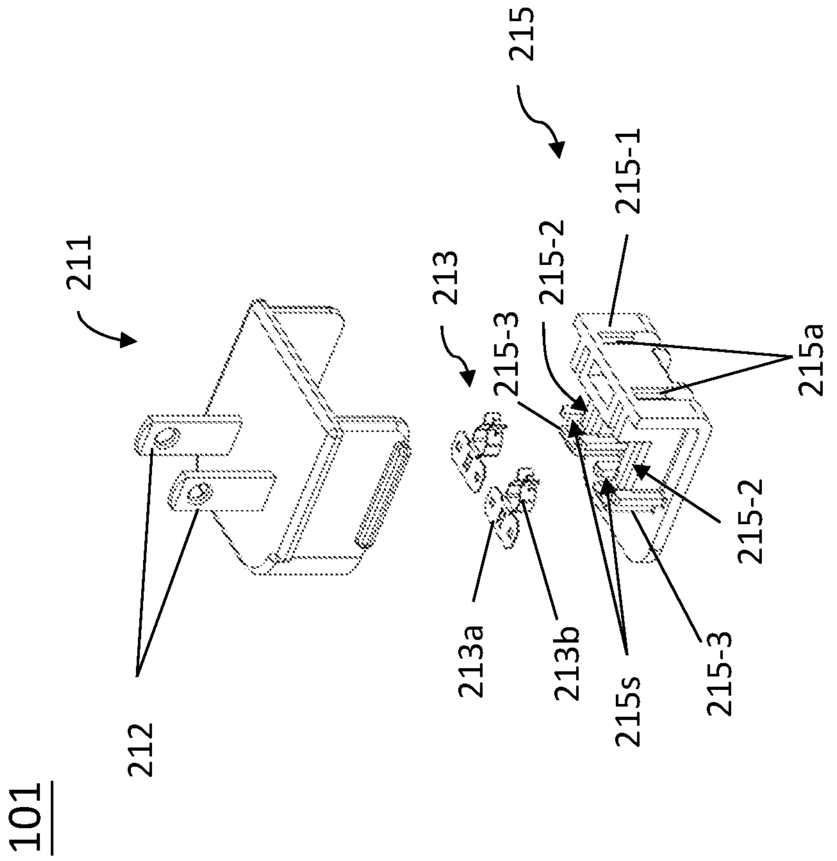
FIG. 3A shows explosion diagram of a plug-in unit according to one embodiment of the present invention.

FIG. 3A illustrates an explosion diagram of a plug unit 101, it includes plug top portion 211 having two plug pins 212, two metal contacts 213, which are made of metal reeds, and a plug base 215.

Figure 3B:
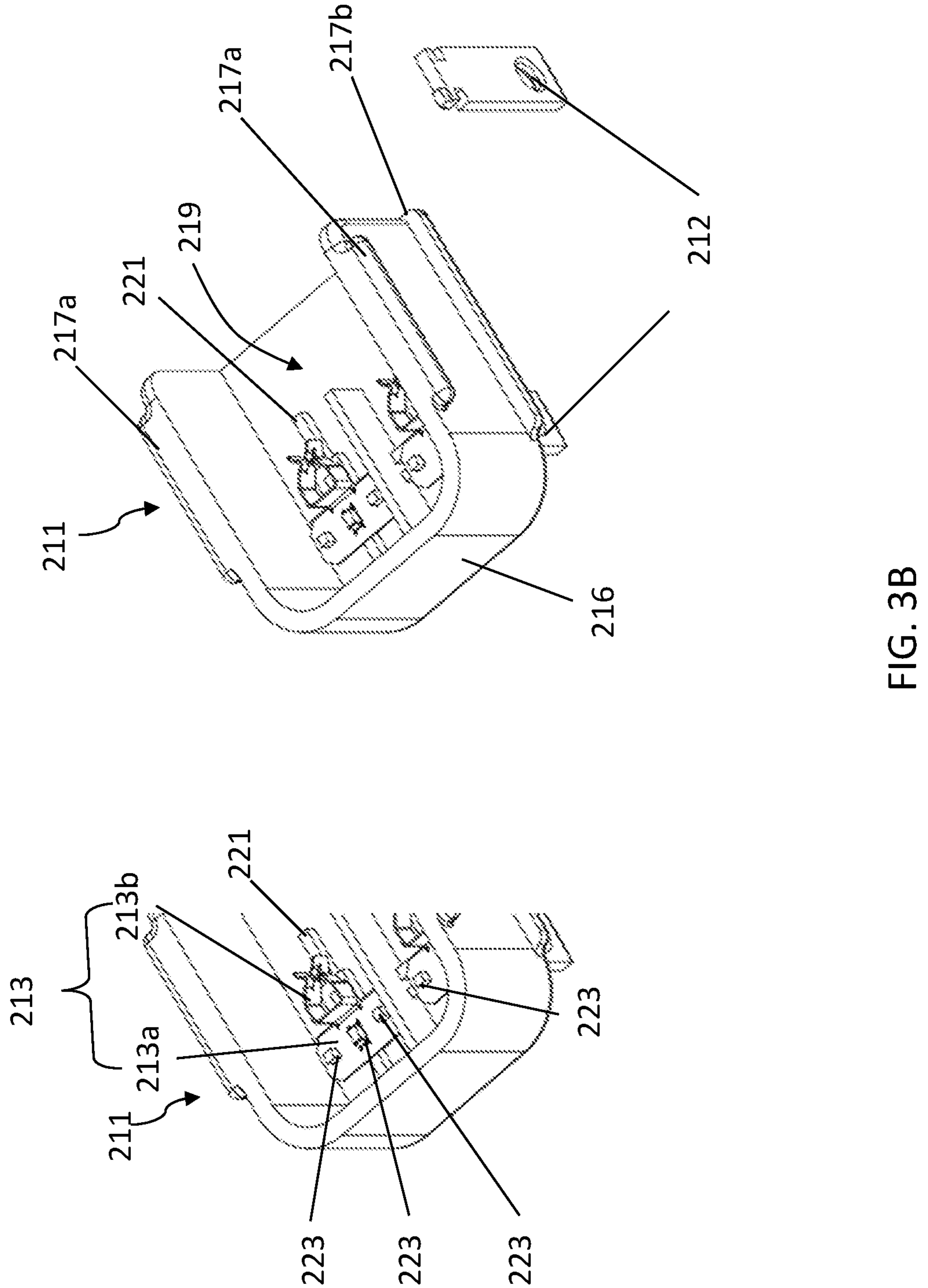
FIG. 3B shows bottom view of the plug-in unit according to one embodiment of the present invention.

FIG. 3B illustrates the bottom side of the plug top portion 211 with two metal contacts 213 being assembled onto. The plug top portion 211 has two pair of guiding bars (217*a*, 217*b*) disposed on outer edges of its side wall 216 to use for slidably engaging the power adapter unit 103 through corresponding guiding grooves 113*b* (see FIG. 2) located at the power adapter unit 103 and a recess 219 with an opening enclosed by the side wall 216. Inside the recess 219, a plurality of guiding ribs 221 and protruding points 223 are used to position and fix the metal contacts 213, where the guiding ribs 221 serve as alignment guide to make each metal contact 213 engaging with corresponding electric contact pin 110 of the power adapter unit 103.

In some embodiments, please refers to FIG. 3A-3B, each of the metal contacts 213 has a flat tail 213*a* and a clamp clip 213*b*, the flat tail 213*a* has a plurality of holes used to match the protruding points 223 for fixation the metal contact onto the plug top portion and also making electrical contact with the plug pins 212.

In some embodiments, please refers to FIG. 3A-3B, the plug base 215 includes a front flange 215-1, rib-like support structure 215-2 with one end merged with the front flange 215-1 the other end with space enclosed by post structure 215-3, where the rib-like support structure 215-2 has two plug guiding slots 215*a* formed all the way from the front flange to the post structure for receiving the electric contact pins 110 of the power adapter unit 103 and interlock with the contact metals 213. The space 215*s* enclosed by post structure is used to embed and secure the clamp clip 213*b* of the contact metals 213. The guiding ribs 221 are respectively aligned with corresponding plug guiding slots 215*a*. Therefore, the assembled plug unit 101 has the metal contacts 213 embedded inside and located at the appropriate positions ready for engaging and making electrical contact with electric contact pins 110 of the power adapter unit 103.

Figure 4A:
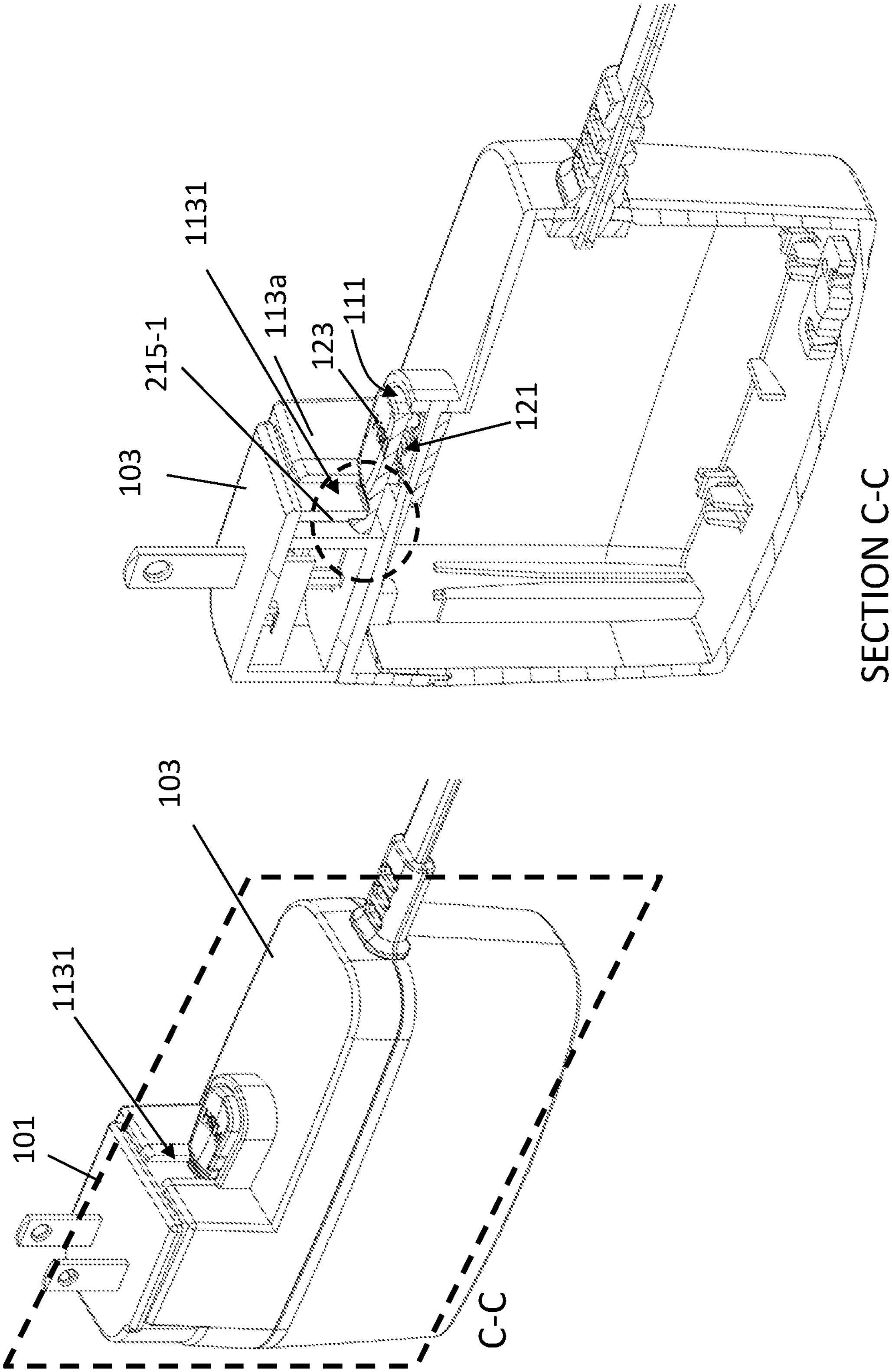
FIG. 4A illustrates a cross-sectional view of the assembled power supply with interchangeable plug according to one embodiment of the present invention.

FIG. 4A illustrates locking mechanism of the assembled power supply 100, the left of FIG. 4A shows a prospective view of the assembled power supply 100, while the right of FIG. 4A illustrates cross-sectional view along C-C section. As shown in FIG. 4A, at the assembled situation, please referring to the circled region of the cross-sectional view, the locking mechanism is established by the interlock between the tail hook of button 123 and baffle of front flange 215-1 of the plug unit 101. When the button 123 is pressed down, locking between the tail hook of button 123 and the baffle of the front flange 215-1 of the plug unit 101 is released.

In some embodiments, the spring 121 is placed in the button recess 111 and the button 123 are disposed on top of the spring 121, where a portion of the button 123 including tail hook of the button 123 is disposed over the engaging base 107 through front gap 1131 of the side walls 113*a* to engage with the plug unit 101.

Figure 4B:
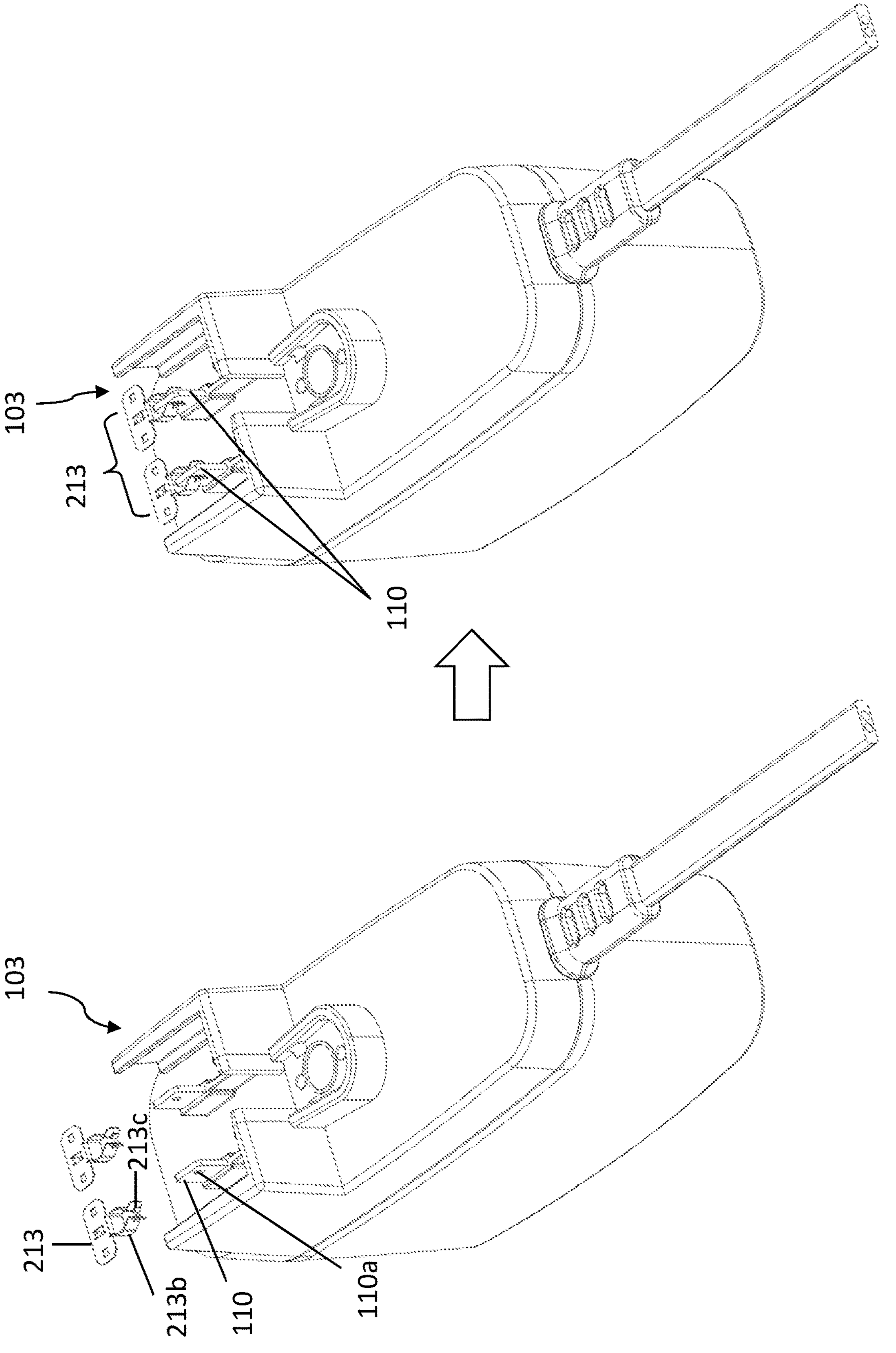
FIG. 4B schematically illustrates the matching movement between the metal contacts of the plug unit and the electric contact pins of the power adapter unit according to one preferred embodiment of the present invention.

FIG. 4B schematically illustrates the matching movement between the metal contacts 213 of the plug unit 101 and the electric contact pins 110 of the power adapter unit 103, which shows that each inner face of the clamp clip 213*b* near the tip has a small bump 213*c* used to interlock with through hole 110*a* of each electric contact pin 110 while the plug unit 101 is engaged with the power adapter unit 103. The interlock between the metal contacts and the electric pins is caused by the elastic force of the clamp clip 213*b* forcing the small bumps 213*c* near the tip of both arms of the clamp clip 213*b* to lock into through hole 110*a* of the electric contact pin 110. In FIG. 4B, its main purpose is to demonstrate the engagement/matching between the metal contacts 213 of the plug unit 103 and the electric contact pins 110 of the power adapter unit 103, details of the plug unit 101 is skipped.

Figure 4C:
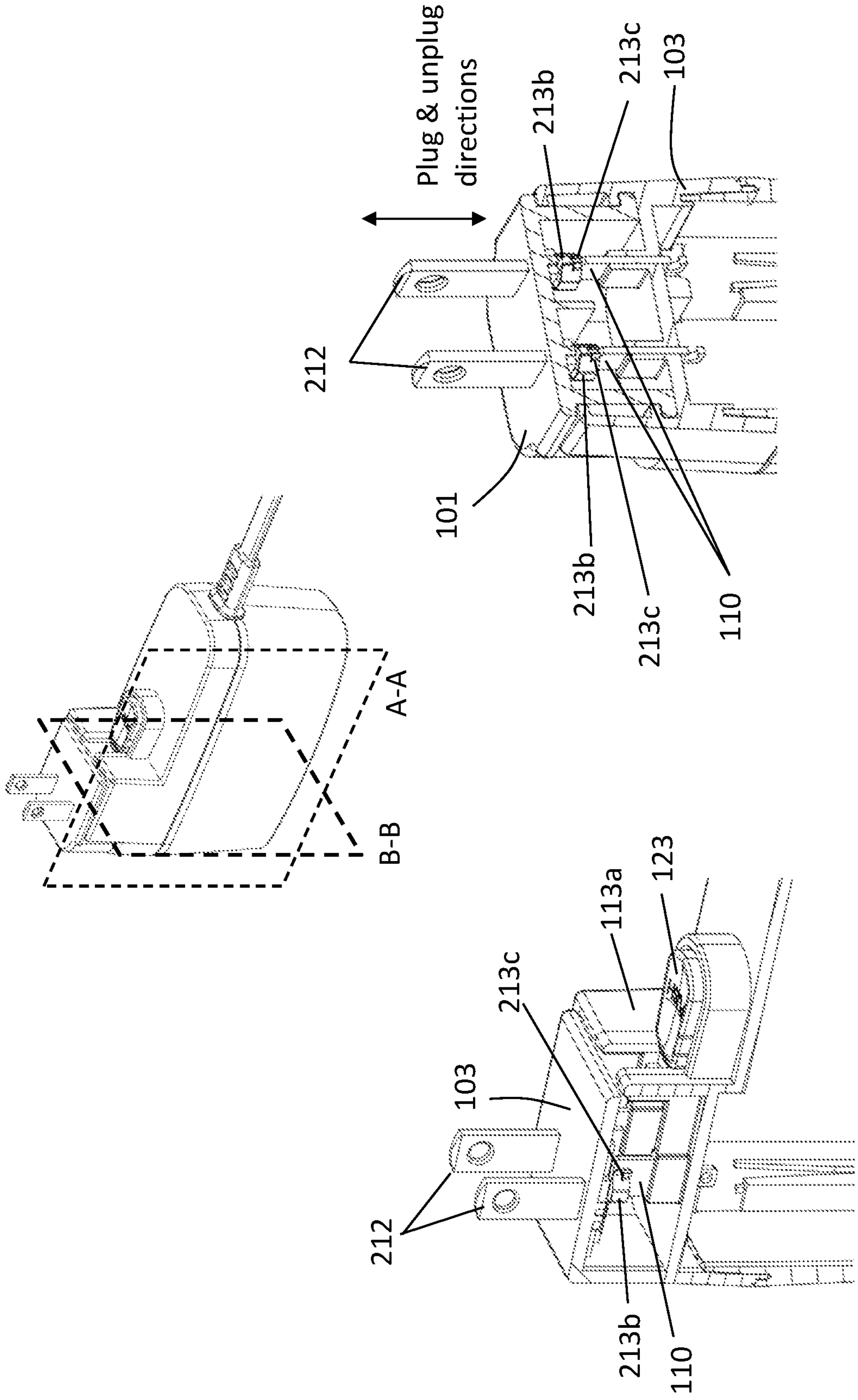
FIG. 4C illustrates cross-sectional views of the assembled power supply in various directions according to one preferred embodiment of the present invention.

FIG. 4C illustrates cross-sectional views of the assembled power supply 100 in various directions, to clearly demonstrate the interlock mechanism between the metal contacts 213 of the plug unit 101 and the electric contact pins 110 of the power adapter unit 103, details of the supporting structure inside the plug unit 101 is neglected, only the metal contacts 213 is depicted. In the cross-sectional diagram shown in section A-A, it clearly demonstrates how the clamp clip 213*b* of the metal contacts 213 interlock with the electric contact pins 110. In the cross-sectional diagram shown in section B-B, the interlock between the metal contacts 213 and the electric contact pins 110 can further provide secured electric contacts while frequently plug and unplug during uses of the power supply 100, therefore prevent loose electric contact from happening. In addition, each of the electric contact pins 110 extends into the interior of the power adapter unit 103 for making electric connections with the power conversion module.

In conclusion, the additional interlock interaction mentioned above offers additional security in keeping electric contact in plug and unplug directions of said power supply to prevent safety issues caused by poor electric contact.

In view of the power adapter unit 103 design shown above, a waterproof design can easily be achieved, since the electric contact pins 110 can be manufactured with top case 105*a* of the housing 105 by integrated molding to form an embedded structure where each pin of the electric contact pins 110 can extend toward both inside and outside the top case 105*a* of the housing 105 for making electric contacts, therefore after waterproof sealing between the top case 105*a* and the bottom case 105*b* and between the housing 105 and the DC cable 127 been completed, the power adapter unit 103 is waterproofed.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A power supply with interchangeable plugs, comprising:

a power adapter unit and a plug unit;

said power adapter unit including:

a housing with an engaging base formed over a bottom surface of said housing;

a power conversion module installed in said housing;

at least two electric contact pins in said engaging base electric connecting with said power conversion module;

a locking member arranged adjacent to said engaging base; and said plug unit being slidably engaged with said engaging base, which including:

at least two plug pins extending from outer side of said plug unit and each of said plug pins electrically connected to one of metal contacts located at inner side of said plug unit;

a locking matching member used to interact with said locking member for allowing said plug unit lock or unlock from said engaging base;

wherein said plug unit is interchangeable with said power adapter unit;

wherein said metal contacts and said at least two electric contact pins provide an additional interlock interaction when said plug unit is slidably engaged with said engaging base of said power adapter unit;

wherein said bottom surface of said housing is an inner side of said power supply facing toward to a power socket inlet while said power supply is plug into said power socket inlet;

wherein said engaging base is enclosed by a pair of side walls protruding from said bottom case surface, each side wall has a front stop, a gap is formed between said front stop of said pair of side walls; and wherein said locking member includes a spring and a button with extended tail hook installed in a button recess formed over said bottom surface of said housing, said spring being disposed beneath said button, said tail hook being extended over said gap to said engaging base.

2. The power supply with interchangeable plugs of claim 1, wherein said plug unit is slidably engaged with said engaging base at said walls.

3. The power supply with interchangeable plugs of claim 1, wherein said button recess is formed along matching direction adjacent to said front stop of said engaging base.

4. The power supply with interchangeable plugs of claim 3, wherein said locking matching member is a portion of front flange of said plug unit used to establish locking interaction with said tail hook of said button, when said button is pressed down, said locking interaction is released.

5. The power supply with interchangeable plugs of claim 1, wherein each of said metal contacts of said plug unit includes a metal reed to form a clamp clip with two arms, a small bump formed on inner surface of each arm near tip; each electric contact pin of said power adapter unit has a through hole.

6. The power supply with interchangeable plugs of claim 5, wherein said additional interlock interaction between said metal contacts and said electric contact pins is established by interlocking between said small bump of said metal contacts and said through hole of said electric contact pin while said plug unit is engaged with said power adapter unit.

7. The power supply with interchangeable plugs of claim 6, wherein said additional interlock interaction offers additional security in keeping electric contact in plug and unplug directions of said power supply.

8. A power supply with interchangeable plugs, comprising:

a power adapter unit and a plug unit;

said power adapter unit including:

a housing with an engaging base formed over a bottom surface of said housing, said bottom surface of said housing is an inner side of said power supply facing toward to a power socket inlet while said power supply is plug into said power socket inlet;

at least two electric contact pins in said engaging base;

a power conversion module installed in said housing electrically connected to said at least two electric contact pins, wherein said at least two electric contact pins are manufactured with said housing by integrated molding to form an embedded structure for enhancing waterproof functionality of said power adapter unit;

a locking member arranged adjacent to said engaging base along matching direction of said plug unit; and said plug unit being slidably engaged with said engaging base, which including:

at least two plug pins extending from outer side of said plug unit and each of said plug pins electrically connected to one of metal contacts located at inner side of said plug unit;

a locking matching member used to interact with said locking member for allowing said plug unit lock or unlock from said engaging base;

wherein said plug unit is interchangeable with said power adapter unit; and wherein said metal contacts and said at least two electric contact pins provide an additional interlock interaction when said plug unit is slidably engaged with said engaging base of said power adapter unit;

wherein said engaging base is enclosed by a pair of side walls protruding from said bottom case surface, each side wall has a front stop, a gap is formed between said front stop of said pair of side walls; and wherein said locking member includes a spring and a button with extended tail hook installed in a button recess formed over said bottom surface of said housing, said spring being disposed beneath said button, said tail hook being extended over said gap to said engaging base.

9. The power supply with interchangeable plugs of claim 8, wherein said plug unit is slidably engaged with said engaging base at said walls.

10. The power supply with interchangeable plugs of claim 8, wherein said button recess is formed along said matching direction adjacent to said front stop of said engaging base.

11. The power supply with interchangeable plugs of claim 10, wherein said locking matching member is a portion of front flange of said plug unit used to establish locking interaction with said tail hook of said button, when said button is pressed down, said locking interaction is released.

12. The power supply with interchangeable plugs of claim 8, wherein said each of said metal contacts of said plug unit includes a metal reed to form a clamp clip with two arms, a small bump formed on inner surface of each arm near tip; each electric contact pin of said power adapter unit has a through hole.

13. The power supply with interchangeable plugs of claim 12, wherein said additional interlock interaction between said metal contacts and said electric contact pins is established by interlocking between said small bump of said metal contacts and said through hole of said electric contact pin while said plug unit is engaged with said power adapter unit.

14. The power supply with interchangeable plugs of claim 13, wherein said additional interlock interaction offers additional security in keeping electric contact in plug and unplug directions of said power supply.

* * * * *